(12) United States Patent
Torres et al.

(10) Patent No.: US 9,593,475 B2
(45) Date of Patent: Mar. 14, 2017

(54) PLUMBING ELBOW

(76) Inventors: Cornelio Torres, Hawthorne, CA (US);
Jose Martin, Inglewood, CA (US)

(*) Notice: Subject to any disclaimer, the term of this patent is extended or adjusted under 35 U.S.C. 154(b) by 145 days.

(21) Appl. No.: 13/486,517

(22) Filed: Jun. 1, 2012

(65) Prior Publication Data

US 2013/0319564 A1 Dec. 5, 2013

(51) Int. Cl.
*E03C 1/30* (2006.01)
*F16L 45/00* (2006.01)
*F16L 55/11* (2006.01)
*F16L 55/115* (2006.01)

(52) U.S. Cl.
CPC ............... *E03C 1/30* (2013.01); *F16L 45/00* (2013.01); *F16L 55/1108* (2013.01); *F16L 55/1152* (2013.01)

(58) Field of Classification Search
CPC .... F16L 45/00; F16L 55/1108; F16L 55/1152; E03C 1/30; E03C 1/302
USPC ....... 285/126.1, 179.1, 179.2, 284.1; 138/36, 138/174; 15/104.33
See application file for complete search history.

(56) References Cited

U.S. PATENT DOCUMENTS

| | | | | |
|---|---|---|---|---|
| 1,702,878 A | * | 2/1929 | Mersfelder et al. | 220/287 |
| 1,816,670 A | * | 7/1931 | Church | 285/179.1 |
| 2,039,467 A | * | 5/1936 | Walsh | 15/104.05 |
| 2,404,259 A | * | 7/1946 | Veitch | 285/179.1 |
| 2,911,235 A | * | 11/1959 | Stumbough | 285/93 |
| 2,950,033 A | * | 8/1960 | Henchert | 222/551 |
| 2,955,851 A | * | 10/1960 | Scott | 285/179.1 |
| 2,977,993 A | * | 4/1961 | Scherer | 138/96 T |
| 3,168,104 A | | 2/1965 | Mathis | |
| 3,872,521 A | * | 3/1975 | Friedman | E03C 1/302 15/104.16 |
| 5,016,923 A | * | 5/1991 | Adamaitis | 285/179.1 |
| 5,110,041 A | * | 5/1992 | Keeler | 229/125.15 |
| 5,301,984 A | * | 4/1994 | Farris | 285/55 |
| 5,452,748 A | * | 9/1995 | Simmons et al. | 138/89 |
| 2002/0163189 A1 | * | 11/2002 | Ahn | 285/179.1 |

FOREIGN PATENT DOCUMENTS

WO   WO 2012160419 A1 * 11/2012

* cited by examiner

*Primary Examiner* — James Hewitt
(74) *Attorney, Agent, or Firm* — Lawrence S. Cohen

(57) ABSTRACT

A pipe system has an elbow 70 with a snake-passing opening 72 (FIG. 3) that is normally closed by a plug 88, with the walls of the snake opening and plug constructed to avoid harmful wear during use of the snake. The elbow forms a nipple 82 that surrounds the snake opening. The nipple has threads (102, FIG. 4) on its outside so snake-caused wear does not initially occur in the threads. The snake opening has an axis 108, and the plug middle forms a cup 112 that extends axially inward to block a majority of the volume within the inner end of the nipple.

2 Claims, 2 Drawing Sheets

PLUMBING ELBOW

BACKGROUND OF THE INVENTION

Household sinks usually have a U-shaped pipe that forms a trap, and have an elbow that follows the trap and a horizontal pipe section that follows the elbow. U.S. Pat. No. 3,168,104 shows an elbow that has a snake opening through which a "snake" can be inserted to clean out a stoppage such as a stoppage in the horizontal pipe section or in other pipe sections connected thereto. A plug closes the snake opening when a snake is not inserted. The elbow commonly has a nipple with internal threads, and the plug can be threaded into the nipple to close it. This results in one spot on the threads of the nipple being exposed to wear by the snake during use of the snake. The snake typically has a rough surface to help it loosen debris, and this rough surface can wear an end of the nipple threads and lead to leaking water. An elbow that provided the advantages of an elbow of the prior art but which avoided concentrated wear that could lead to water leakage, would be of value, especially where plastic pipes are used.

SUMMARY OF THE INVENTION

In accordance with one embodiment of the present invention, an elbow is provided, which has a snake opening with an axis, which avoids concentrated wear that can cause leakage. The elbow has a nipple with nipple threads on the radially outer surface of the nipple. As a result, the nipple threads are initially not worn by vigorous use of the snake. The plug has threads on the radially inner surface of the plug. If there is wear at the axially outer end of the nipple, this does not result in wear of a thread, which could cause leakage.

The plug has a plug middle that extends axially inward and that covers almost all volume within the nipple. This avoids creation of a "dead space within the elbow.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
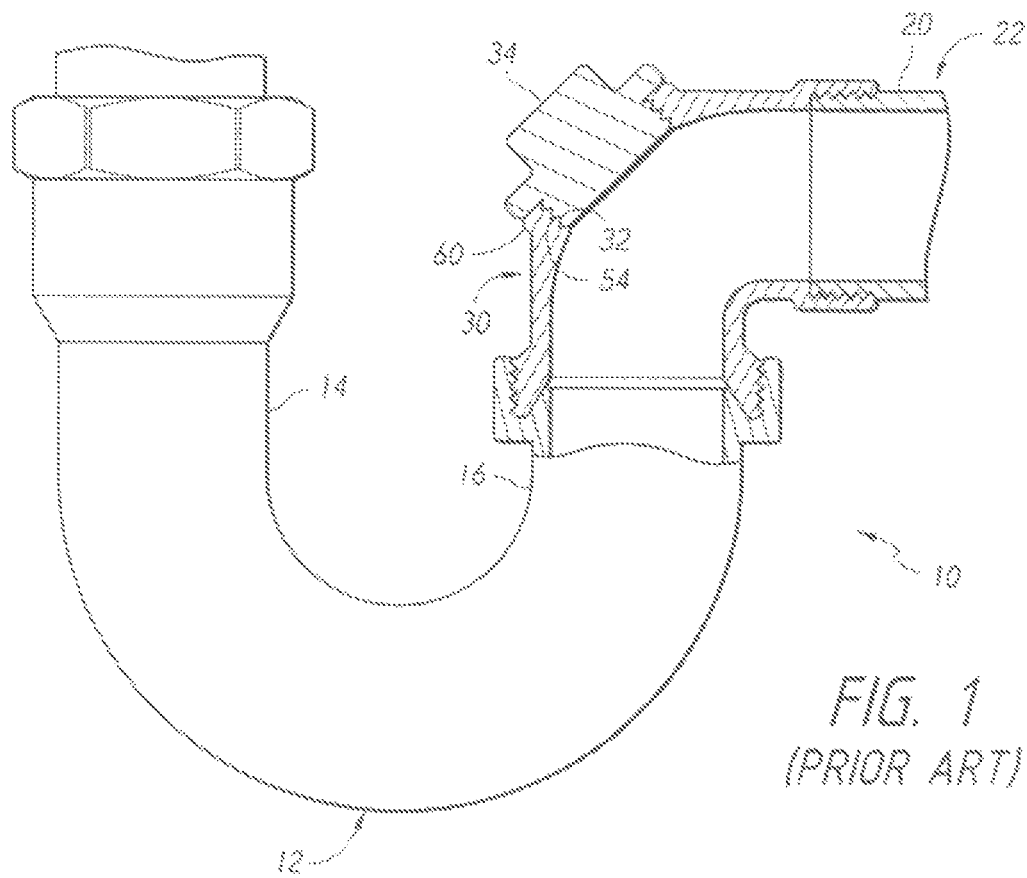
FIG. 1 is a partially sectional view of a pipe arrangement showing an elbow of the prior art.

FIG. 1 shows a prior art elbow pipe arrangement 10 which is commonly present under sinks of homes. The arrangement includes a U-shaped pipe 12 with one primarily vertical end 14 that connects to a sink outlet, and an opposite primarily vertical end 16 that connects through an elbow 30 to a primarily horizontal segment 20 of a drain pipe 22 that leads to a drain. The arrangement also includes an elbow 30 with a primarily right angle bend (30° to 60°).

Figure 2:
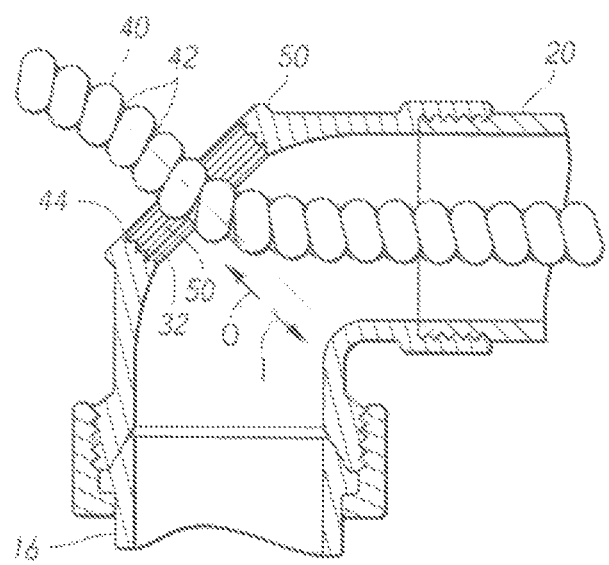
FIG. 2 is a sectional view of a portion of the elbow of FIG. 1 and of the prior art, showing the plug removed and a snake lying in the elbow opening.

The elbow 30 includes a snake opening 32 and a plug 34 that can be removed and reinstalled on the elbow. FIG. 2 shows the plug removed so a cleanout snake 40 can be installed though the opening. The snake can be directed into horizontal or vertical pipe sections 16 or 20, but usually enters the horizontal pipe section. The snake is usually made of steel, with grooves 42 that result in a rough surface to remove dirt and debris that might clog the pipe arrangement.

One problem that is encountered with the prior art arrangement of FIG. 2 is that continued use of the snake can result in wear of the walls of the elbow snake opening 32. Such wear is especially likely at the lower side of the snake opening at an axially outward O location 44 where the snake passes across the lower side of the snake opening threads 50. The elbow of the prior art has internal threads 50, and the plug 34 that can cover the opening has threads 54 on the outside of the plug. The elbow usually forms a nipple 60 with internal threads, and the plug screws into the nipple.

If one side of an opening thread or one side of a plug thread is worn away, then water can leak though that opening. If the elbow is made of a material that is much softer than steel, such as a common plastic (e.g. polyvinyl chloride), then the danger of leakage by thread wear is even greater.

Figure 3:
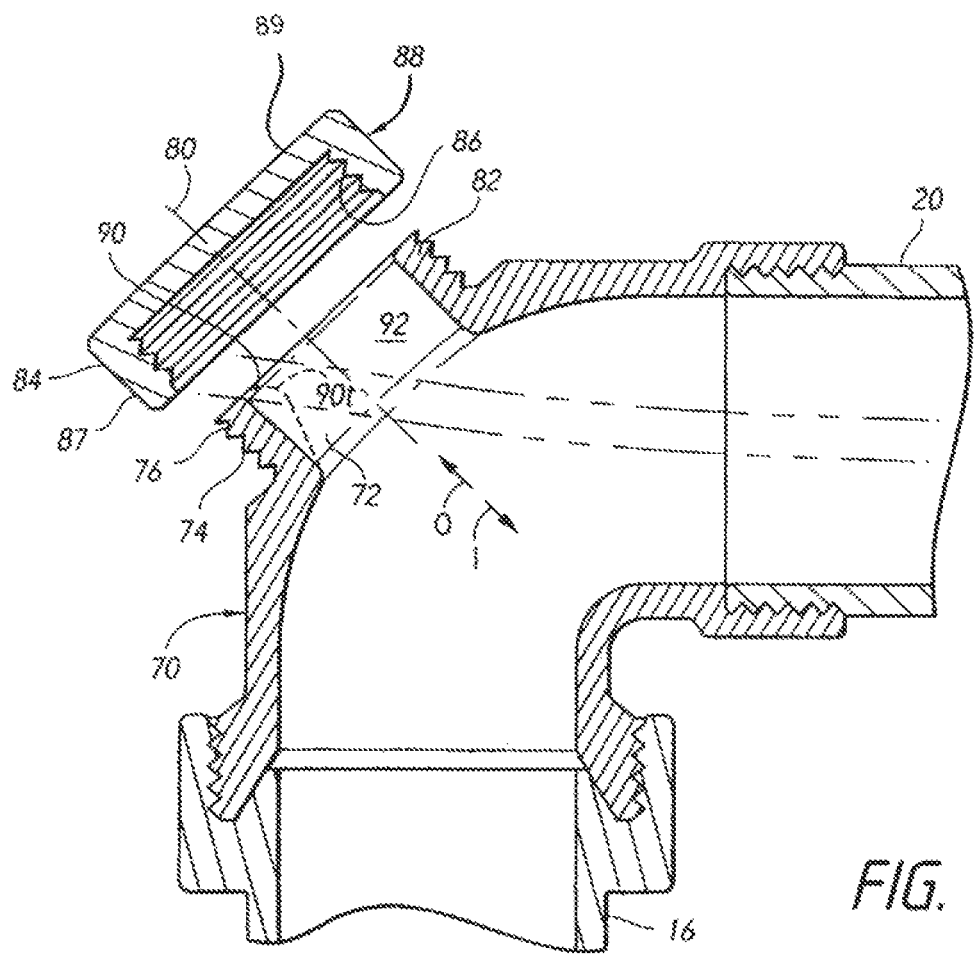
FIG. 3 is a sectional view of an elbow of the present invention, showing the plug raised above its normal position.

In accordance with one embodiment of the invention, application provides an elbow 70 of the type shown in FIG. 3, where the elbow has threads 74 on the outside surface 76 of the elbow nipple. The snake opening 72 has an opening axis 80 (also called a nipple axis) and is formed with a nipple 82 and with nipple threads 74 on the radial outside of the nipple 82. The plug 88 has a ring 84 with an outer surface 87 in the form of a hexagon so a wrench can be used to turn the plug. Plug threads 86 on the plug 88 lie on the inside surface of the ring 84 which threadably receives the nipple 82 by the nipple threads 74 being threaded to the plug threads 86. Accordingly, the plug threads 86 are inner threads and the nipple threads 74 are outer threads. The plug 88 has a cover 89 that extends across the top of the ring 84 closing it so as to effect closing of the snake opening 72 when the plug 88 is threaded down on the nipple 82.

When the plug 88 is removed and a snake is moved back and forth in the elbow opening, wear occurs primarily at the location 90 which is at the lower side of the nipple inside surface, near the axially outer O end of the nipple. The location 90 can be thickened as to 90t to provide an additional volume that can be worn.

Figure 4:
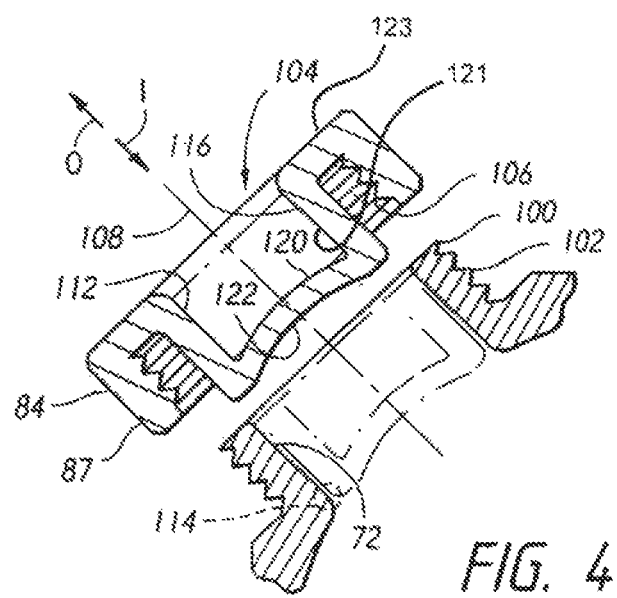
FIG. 4 is a sectional view of an elbow and plug of another embodiment of the invention.

One problem that can arise with the design of FIG. 3 is that a large dead space 92 is left under the plug 88. Such dead space should be minimized to minimize the build-up of slime etc. FIG. 4 shows another elbow pipe arrangement, in which the nipple 100 that lies about the snake opening does not have threads on the inside surface of the nipple. The nipple threads 102 lie on the outside of the nipple as outer threads and the plug 104 has plug threads 106 that face radially inwardly as inner threads and defining a threaded inside surface, towards the opening axis 108 (also called the nipple axis). However, to minimize dead space, applicant constructs the plug with an inwardly projecting cup 112 which fills the dead space. The plug construction also allows a seal ring to be located at 114 on or below an inward facing surface of the nipple or on the outward-facing smooth surface of the cup. The cup 112 includes an inwardly I projecting hollow cylinder 116 and a largely radially (to axis 108) inner wall 120 that is preferably concavely rounded on its inner surface 122.

The plug 104 also has the ring 84 with an outer surface 87 in the form of a wrench-engaging surface so that a wrench can be used to turn the. However, instead of a cover 89 across the top of the plug as in the version of FIG. 3, the plug 104 has a plug middle comprising a cup 112 having a cylindrical wall 121 forming the inwardly (I) projecting hollow cylinder 116 that extends axially inward co-axially with the nipple axis 108 and concentrically with and radially inwardly spaced from the threaded inside surface with the inner threads 106 and terminating with the inner wall 120 closing the bottom of the cup 112. The plug middle is formed integrally with the ring 84 by attachment at an outer end of the cylindrical wall 121 to a rim portion 123 that is attached to the ring 84.

Thus, the invention provides an elbow pipe arrangement that includes an elbow with an access opening for passing a cleanout snake and a plug for normally keeping the opening closed, which minimizes snake-caused wear. The opening has an axis and has threads on the radially outer side of the opening, while the plug has threads on the radially inner side of the opening. The elbow forms a nipple and the opening threads lie on the outer side of the nipple. A dead space that lies within the nipple is largely blocked by a cup-shaped portion (the inwardly projecting hollow cylinder 116) of the plug that projects into the dead space.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An elbow arrangement that includes:
  a pipe with an elbow having an approximately right angle bend, primarily horizontal and vertical pipe parts extending from said bend, a cleanout opening in said bend, said cleanout opening having an opening axis extending approximately 45° to said pipe parts, and a plug that is detachably mounted to said elbow at said cleanout opening, wherein:
  at said cleanout opening said elbow arrangement forms a nipple with a primarily cylindrical inside and outside nipple surface having a nipple axis co-axial with said opening axis, said outside nipple surface being threaded and said cylindrical inside defining a dead space volume within the nipple; and
  said plug has a ring with a threaded inside surface that is threadably mateable to said nipple-threaded outside surface, and having a wrench-engaging outer surface and said plug has a plug middle comprising a cup formed by a cylindrical wall forming an inwardly projecting hollow cylinder that extends axially inward co-axially with the nipple axis and concentrically with and radially spaced from said threaded inside surface terminating with an inner wall closing the hollow cylinder to block a majority of the dead space volume and said plug middle being formed integrally with said ring by attachment at an outer end of the cylindrical wall to a rim portion that is attached to an outer end of the ring;
  whereby the plug upon being threadably mated with the nipple will have the nipple inside a space between the ring and the hollow cylinder and the hollow cylindrical being closed by the inner wall substantially blocking a majority of the dead space volume so that debris and other objectionable material is blocked from the dead space volume and the wrench-engaging surface is immediately proximate to the pipe and there is no risk to interior threads from a clean out device.

2. The arrangement described in claim 1 wherein: said inner wall has a concavely rounded inner surface.

* * * * *